United States Patent Office 3,472,267
Patented Oct. 14, 1969

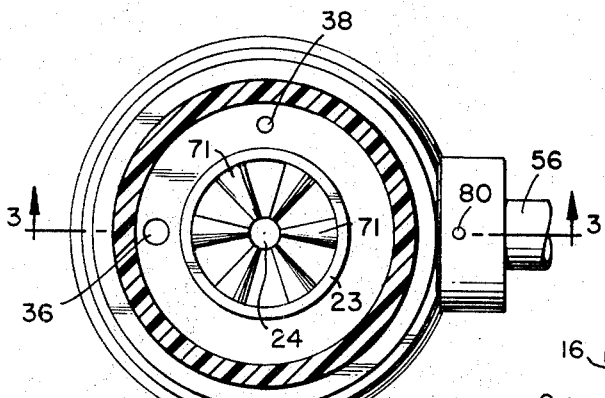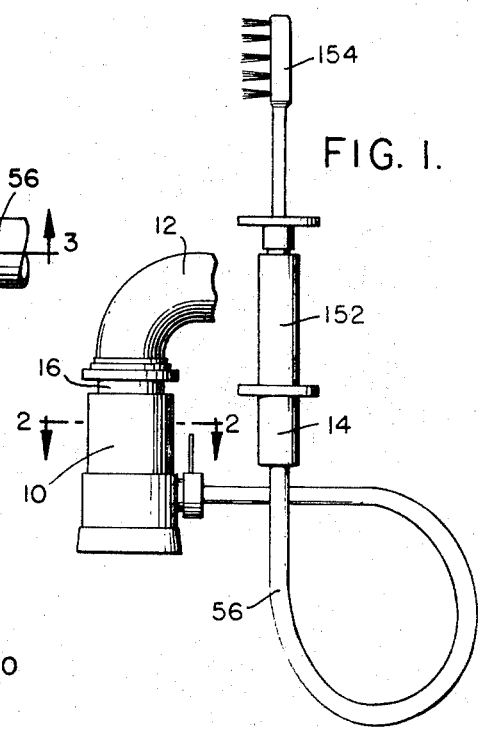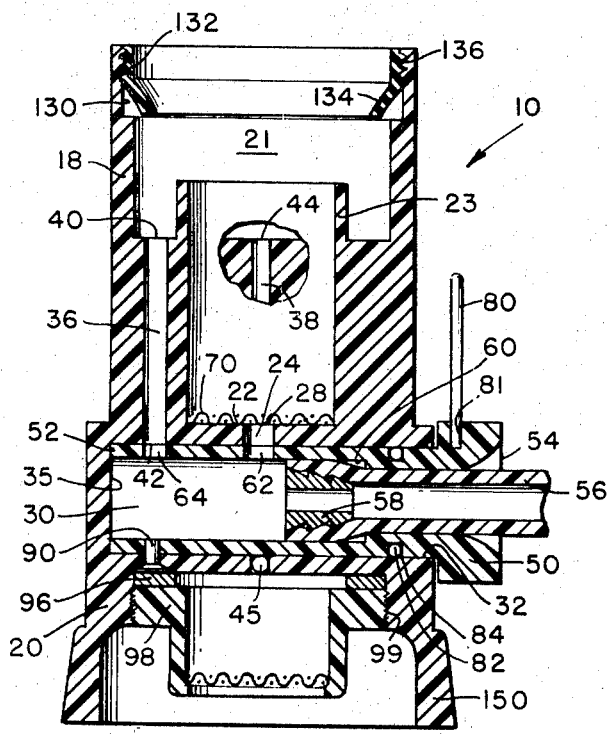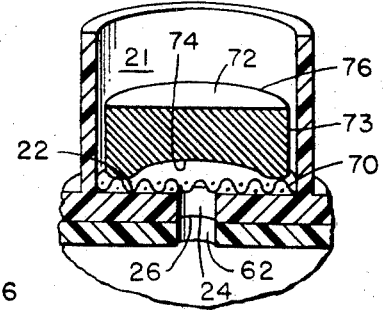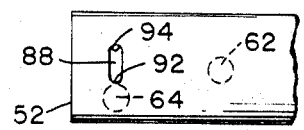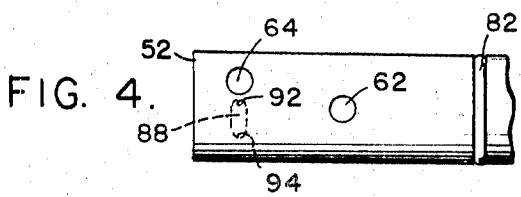
INVENTORS.
ADOLPH W. BORSUM
WILLIAM K. BORSUM
ATTORNEY.

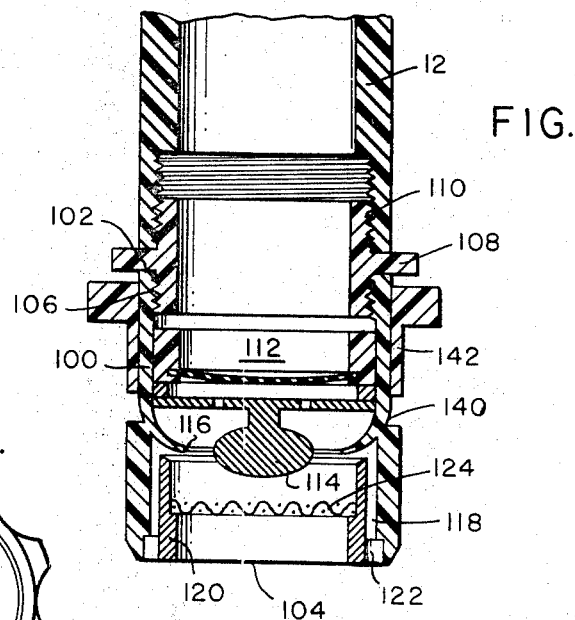
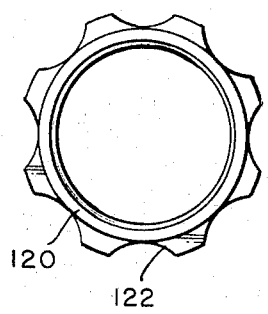
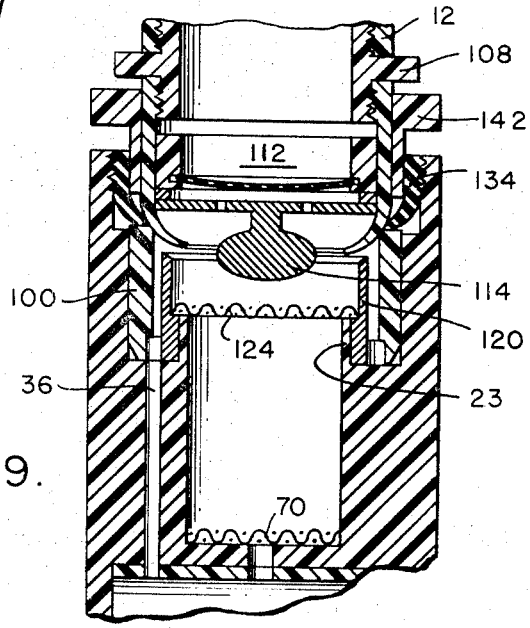

3,472,267
MIXING, DISPENSING AND METERING DEVICE
Adolph W. Borsum and William K. Borsum, both of
521 Pacific Ave., Solana Beach, Calif. 92075
Filed Apr. 27, 1967, Ser. No. 635,323
Int. Cl. E03c 1/046
U.S. Cl. 137—268                                                10 Claims

ABSTRACT OF THE DISCLOSURE

The invention is a mixing, dispensing and metering device which comprises a generally cylindrical body, a bore within the body, and aperture which is sectionally smaller than the bore and in communication with the bore, a partial bypass passageway, a complete bypass passageway and a valve means which can control the amount of fluid passing through the aperture and the partial bypass passageway. A soluble pellet may be supported by a screen just upstream of the aperture so that as fluid increases in velocity because of the restricting aperture the downstream side of the pellet is eroded in a controllable and predictable manner, the control for a given pellet depending upon the fluid flow rate and the fluid temperature only.

---

The invention described herein may be manufactured and used by or for the Government of the United States of America for governmental purposes without the payment of any royalties thereon or therefor.

BACKGROUND OF THE INVENTION

Field of the invention

The invention relates to a mixing, dispensing and metering device and more particularly to a mixing, dispensing and metering device disposed within a fluid conduit system for dissolving soluble pellets placed within the device.

Description of the prior art

Dispensing units for dissolving soluble pellets are old in the art as illustrated by Patent No. 3,191,915 to G. Goettl. In the patent a chemical pellet is shown disposed within a chamber made up of perforated screen walls and floor. A stream of fluid is made to flow through the perforated screens past the pellet and then exhausted through outlet conduits. The dissolving rate or rate of solution of the pellet is, however, unknown and difficult to control and to determine. It depends upon the fluid flow rate, the temperature and also to the degree the pellet is bounced around within its chamber. The degree of bouncing of the pellet is unknown and can only be approximately estimated, unlike the flow rate and the temperature of the fluid; a pellet which is violently bounced against its coarse chamber walls will tend to break up into chunks and thereby dissolve in a quicker manner than if the pellet becomes lodged in a corner of the chamber and remains there throughout the dissolving process.

Usually in a process in which the rate of solution is important, means must be used to compensate for the uneven dissolving of the pellet by having controls over the fluid flow or fluid temperature or by having another fluid conduit connect to the main conduit at some downstream point so that pure fluid may be added as it is needed to adjust the concentrations of the elements within the mixture. Our invention does away with the control problem by providing a chamber in which a pellet remains in a constant location and which allows the pellet to be dissolved at a rate which is a function only of the fluid flow rate and its temperature.

More broadly our invention is adapted to be useful in many different types of applications in fields such as medicine, dentistry, industrial and home use. For instance, in a medical field an embodiment of our invention in combination with our previous inventions entitled "Push-Pull Connector" and Stem Actuated Valve" may be used as a syringe for the hygienic cleaning of the genitalia and the anus. In the dental field our inventions including one entitled "Hydraulic-Filament Dental Device" may be used as a water pick or syringe for the cleansing of the teeth. For the home our inventions may be used for the cleaning of dishes, automobiles, floors, windows and in conjunction with a garden hose as an insecticide applicator. These may all be accomplished by varying the size of our device and providing a pellet specially compounded for the specific use.

SUMMARY OF THE INVENTION

The abovementioned advantages are achieved by our invention which comprises a main body having an upstream portion and a downstream portion, a first bore in the body of its upstream portion extending in a generally downstream direction through the body to a downstream end, the end forming a base, an aperture in the body which is sectionally smaller than the first bore, communicating with the bore at the base and extending in a downstream direction, and means located upstream of said aperture for supporting a pellet and for passing a fluid along the downstream side of the pellet to wash and dissolve the pellet.

An object of the invention is to provide a mixing, dispensing and metering device which is inexpensive to manufacture, simple to operate and adaptable to a wide range of applications.

Another object of the invention is to provide a mixing, dispensing and metering device wherein a pellet may be dissolved in an easily discernible manner and in which the mixing and dispensing of a fluid solution is completely controllable.

Still another object of the invention is to provide a mixing, dispensing and metering device which is adapted to mate with a spigot and also adapted to mate with nozzle attachments and storage devices.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a front view of a preferred embodiment of our invention illustrating its engagement with a spigot and a stem actuated valve.

FIG. 2 is a partial top section view taken along line 2—2 of FIG. 1 and illustrating one embodiment of a supporting and passing means.

FIG. 3 is a full front section taken along line 3—3 of FIG. 2 and illustrating another embodiment of a supporting and passing means.

FIG. 4 is a partial top view of a tubular valve.

FIG. 5 is a partial bottom view of a tubular valve.

FIG. 6 is an enlarged isometric partial front section view of the embodiment shown in FIG. 3 and including a pellet.

FIG. 7 is a partial front section view of a connector attached to an end of the spigot.

FIG. 8 is a top view of a channel element shown in FIG. 7.

FIG. 9 is an enlarged partial front section view of the preferred embodiment as shown in FIG. 1.

DESCRIPTION OF THE PREFERRED EMBODIMENT

Referring now to the drawings wherein like reference numerals designate like or corresponding parts throughout the several views, there is shown in FIG. 1 a front view of our invention illustrating a main body 10 which may be generally cylindrical in shape attached to a spigot 12 or other fluid source outlet and including a stem actuated valve handpiece 14. It is noted here that a push-pull connection designated at 16 is covered by a separate copending patent application identified as Ser. No. 606,465, filed Dec. 30, 1966 and entitled "Push-Pull Connector." The stem actuated valve 14 forms the subject matter of another copending patent application Ser. No. 627,595, filed Mar. 29, 1967 and entitled "Stem Actuated Valve." While the invention of this application deals with mixing, dispensing and metering means within the body 10, the preferred embodiment illustrated in FIG. 1 has been ideally adapted to be combined with our other inventions so as to show its application in the dental cleansing and oral hygiene field, though it is understood that far greater application exists in many other fields.

The generally cylindrical body 10 is comprised of two portions, an upstream portion 18 and a downstream portion 20, FIG. 3. A first bore designated 21 within the body 10 in its upstream portion 18 extends in a generally downstream longitudinal direction through the body terminating at a downstream end which forms a base 22. The bore 21 may be of varying diameter throughout its length and may have a somewhat greater diameter toward its upstream end and a somewhat smaller diameter toward its downstream end. This may be accomplished as shown in FIG. 3 by inner wall 23 which forms a tubular body within the bore 21 for a purpose which will be discussed below.

Downstream of the bore 21 is an aperture 24, FIGS. 2, 3 and 6, which communicates with the bore 21 at the base 22 and extends in a downstream direction to a downstream portion and communicates the first bore 21 with the external environment about the body 10. The aperture 24 is sectionally smaller than the first bore 21 and is disposed with respect to the first bore so that any fluid which is introduced at the upstream portion 18 into the first bore will proceed in a downstream direction through the bore 21 and then through the aperture 24. Because the aperture has a smaller cross-section than the first bore the fluid will increase in velocity as it flows through the aperture.

A second bore 30 in the body 10 may be formed in the downstream portion of the aperture 24, generally transverse with respect to the first bore.

It is now apparent that a conduit has been formed comprised of the first bore 21, the aperture 24 and the second bore 30 so that fluid received by the upstream portion 18 will exit at the mouth 32 of the second bore.

Two passageways may be formed in the cylindrical body 10, a partial bypass passageway 36, FIG. 3, and a complete bypass passageway 38, FIG. 2. The partial bypass passageway 36 opens at an upstream end 40 to the first bore 21 and opens at a downstream end 42 to the second bore 30. The complete bypass passageway 38 opens at an upstream end 44 to the first bore 21 and extends through the body 10 to a downstream end 45. The complete bypass passageway 38 is adapted to remain open at all times during the functioning of the apparatus. By having a complete bypass passageway, fluid may be able to flow to the first bore 21 and into the complete bypass passageway 38 and then be exhausted to a drain from the end 45. Thus, when the fluid is purposefully restrained from following any other path, a user may be able to generally determine the flow rate and the temperature of the fluid as it exhausts from end 45. The complete bypass passageway may also act to relieve back pressure which occurs when the stem actuated valve 14 is suddenly closed, thus having a cushioning effect on the device and related plumbing.

A movable valve means such as tubular valve 50 may be movably connected within the second bore 30 and constructed to have an outer diameter slightly smaller than the diameter of the second bore so as to fit snugly therein and yet be able to rotate and/or slide. The tubular valve 50 may have two open ends, one end 52 abutting wall 35, while the other end 54 is adapted to receive a fluid conduit 56 for dispensing a mixed, metered fluid solution. As is shown, the fluid conduit 56 may be connected to the valve 50 by having the conduit receive a tube expander 58 in its end. The tube expander 58 is adapted to wedge the end of the conduit 56 between itself and a flange 60 formed within the valve for the purpose of such wedging engagement. It is noted that while the preferred embodiment shows the combination of a tube expander 58 wedging the conduit end against a flange, such is nothing more than a convenient connection, any other suitable connection may also be used.

The tubular valve 50 may have two apertures 62 and 64, FIG. 4; aperture 62 is adapted to selectively align with aperture 24 and aperture 64 is adapted to selectively align with passageway 36 so that the valve may selectively open and close the aperture 24 and passageway 36. However, the two apertures 62 and 64 in the valve body are radially offset one from the other so that, for example, to have a complete alignment between aperture 62 and aperture 24 requires that there be a complete misalignment between aperture 64 and passageway 36. A slight rotation of the tubular valve 50 causes one of the pairs to start misaligning while it causes the other pair to begin aligning. If aperture 64 is in alignment with passageway 36 then aperture 62 is no longer in alignment with aperture 24. The longitudinal axis of the partial bypass passageway 36 and the aperture 24 form a plane; this plane, at most, will contain the longitudinal axis of only one of the apertures 62 or 64. The longitudinal axis of the remaining aperture will be external of this plane. By rotating the valve to some intermediate position it is possible to have any degree of partial alignment of the apertures and the aperture and passageway so that the amount of fluid passing through the partial bypass passageway 36 and the aperture 24 may be closely controlled. Such control allows close proportioning of the ingredients in the resulting solution which eventually flows through the conduit 56. The importance of this control will become apparent below.

It is to be noted that while a rotatable valve is shown and described, other types of valves, such as a sliding type may be used to achieve the desired alignments and thereby control the solution.

Means are located above the aperture 24 for supporting a pellet 72 and for passing a fluid along the downstream side 74 of the pellet so as to wash and dissolve the pellet. Two embodiments of such means are shown, a screen 70 in FIGS. 3 and 6 and an irregularity upon the base 22 comprised of a series of radial humps 71, FIG. 2 (other configurations may be used to achieve the desired results, such as radial grooves, small humps randomly placed or sharp needlelike projections which may positively engage the pellet—the desired result is that fluid may be able to flow around and under the pellet so as to wash the underside of the pellet). As best seen in FIG. 6, the arrangement just described offers one of the major advantages of our invention. Having the pellet 72 of a smaller diameter than the inner wall 23 so that a sufficient amount of fluid may pass around the pellet, and having the pellet confined transversely by the inner wall which acts as a partition to position and retain the pellet, and additionally having the support means, whether it be the screen 70 or the humps 71, locate the pellet just upstream of the opening 28 of the aperture 24, fluid which may be flowing from the first bore 21 downstream into the aperture 24 will have to flow around the pellet 72 before entering the aperture 24. This flow will cause a pressure upon the pellet so as to firmly seat it upon the support means. As mentioned, the velocity of the fluid flow from the first bore into the aperture 24 will increase because of the differences in sectional area. This flow increase will occur generally along the base 22 within the space defined by the downstream side 74 of the pellet 72 and the base 22 and along the annular side 73 of the pellet. Not only is there an increase in velocity of the fluid flow, but because of the placement of the screen 70 or the humps 71 in this space a slight turbulence is created; these factors cause a distinct washing of the pellet on its downstream side 74 causing a gradual but determinable erosion depicted by illustrating side 74 concave in FIG. 6. It should be noted that while the stream of fluid would impinge upon the pellet's upstream side 76, very little washing occurs there whereas substantial washing occurs at the downstream side 74. It is this phenomenon that allows the close estimation of the time it would take for a pellet to be completely dissolved. This is a distinct advantage over the prior art in which the pellet is allowed to be tumbled or bounced about its chamber by the fluid flow causing a short irregular rate of dissolution. And if the pellet in the prior art ever should be pressed into one of the corners of a chamber, the dissolving time may be undesirably lengthened because the same effect would occur upon the pellet as occurs in our invention upon the upstream side 76; that is, fluid would tend to eddy and bypass the surface with little erosion taking place. Therefore, in our invention the dissolving rate will depend primarily upon two variables, the velocity of the fluid flow and the fluid temperature, both of which may be easily regulated.

It now becomes apparent that the function of the tubular valve 50 is to meter the rate of solution of the pellet 72 and the percentage concentration of the solution (or suspension) to be received by the conduit 56. By aligning the apertures 24 and 62 to a greater degree than alignment of aperture 64 and passageway 36 more fluid will flow around the pellet causing more of the pellet to dissolve. The mixing that takes place within the interior of the tubular valve will be between a relatively strong pellet solution flowing through apertures 24 and 62 and a relatively lesser amount of pure fluid which bypasses the pellet location through the passageway 36 and aperture 64. By reversing the alignment more fluid may be passed through the bypass passageway 36 and aperture 64 and less through the pellet location. Thus a weaker pellet solution is mixed with a greater amount of pure fluid.

It is to be noted that a pellet 72 of conventional shape is shown and described. However, a torus or doughnut-shaped pellet could be used with a placement around the inner wall 23 so that a pellet solution may be adapted to flow through passageway 36 and aperture 64 with pure fluid flowing through apertures 24 and 62. Likewise, the placement of the support and passing means, such as screen 70, would be located in the area between the surface of the bore 21 and the inner wall 23 rather than on base 22 as illustrated. Another embodiment may combine the use of two pellets, one of conventional shape and one of a torus shape, the conventional pellet located within the inner wall 23, the torus pellet located about the inner wall 23 so that mixing of different pellets with a fluid may be achieved. Or the volume within the inner wall 23 may be compartmentalized and more apertures similar to aperture 24 added so that several pellets may be washed and mixed in solution. There may be many modifications based on individual applications which come within the scope of our invention, those mentioned above only exemplify a few of the possible alternatives.

Rotation of the tubular valve may be by any convenient means such as handle 80 which may be suitably attached to the tubular valve, such as press-fitting into slot 81. A dial (not shown) may be placed on the cylindrical body 10 opposite the handle 80 for indicating the relative percentage of alignment of the apertures and thus giving a rough indication of the rate of solution or of pellet erosion. A user from experience will quickly adapt flow rate and temperature of the fluid to be generally constant so that only the degree of valve alignment determines the strength of the resultant solution. An O-ring 82 is placed within a corresponding groove 84 in the tubular valve body for preventing leakage of fluid between the outer surface of the tubular valve and the surface of the second bore 30. Limited rotational and translational motion of the tubular valve 50 may be accomplished by having a means such as slot 88, FIG. 5, placed in the valve 50 radially offset from the apertures 62 and 64 by about 180°. A pin 90, FIG. 3, anchored in the cylindrical body 10 passes through the slot 88. The apertures 62 and 64 determine the length of the slot 88, the pin 90 abutting slot end 92, FIG. 5, when aperture 62 is in alignment with aperture 24 and the pin 90 abutting slot end 94 when aperture 64 is in full alignment with passageway 36. An annular spacer 96, FIG. 3, may be used to retain the pin in its location and a perforated plug 98 threaded at 99 to the cylindrical body 10 may be used to hold the spacer 96 through the complete bypass passageway 38. The plug 98 may also be adapted to control the amount of flow in place as well as to pass the fluid which has flowed through passageway 38 so as to prevent passageway 38 from acting as too great a pressure release on the fluid in bore 21.

Viewings FIGS. 1 and 9, our preferred embodiment is shown in a position connected to a fluid source which may have the spigot 12 at its dowstream end. Attached to the downstream end of the spigot 12 may be a tubular body 100, FIG. 7, having an upstream end 102 and a downstream end 104. The tubular body may be threaded at 106 to a spigot adaptor 108 which may in turn be threaded at 110 to the spigot 12. Near the upstream end 102 may be a backflow preventer designated 112. Downstream from the backflow preventer 112 may be means for constricting a flow of fluid such as a bulb-shaped element 114 which acts with a transverse projection 116 to cause a reduced transverse area in the path of fluid flow.

The transverse area forming the vicinity about the bulb-shaped element 114 may communicate with the external environment about the spigot by means of a series of channels 118 formed between the interior wall of the tubular body 100 and an annular ring 120, FIGS. 7 and 8. When the tubular body 100 is shown as in FIG. 7 the channels 118 communicate with an external environment which is usually atmospheric air; when the body 100 is connected with the body 10 the channels communicate with an external environment including the passageways 36 and 38. The annular ring has a bottom portion having a series of annular cutouts 122 through which fluid is allowed to pass and forms a downstream end of the channels 118. The ring may be pressfitted to the tubular body. Mounted across the annular ring and downstream of element 114 is a perforated means such as screen 124.

When no connection has been made between the tubular body 100 and the main body 10, the combination of elements just described within the tubular body act as an aerator. During a flow of fluid a venturi effect is created as the fluid is forced to increase its velocity in the vicinity of the bulb-shaped element 114; this is occasioned by the constriction caused by the element 114 and projection 116. Since an increased flow velocity causes a reduction in pressure, air or other fluid will be sucked through the channels 118 from the external environment to mix with the fluid and achieve an aerated fluid flow.

When the tubular body 100 and main body 10 are connected, see FIG. 9, the inner wall 23 and screen 124 combine to form an enclosed chamber for the pellet; the channels 118 communicate with the partial bypass passageway 36 and the complete bypass passageway 38. When the aperture 24 is open fluid will flow through screen 124 and around and under the pellet. When the aperture 24 is closed fluid will divert into the channels 118 and into the passageways 36 and 38. When the aperture 24 and passageway 36 are each partially opened fluid will flow through the screen 124 and through the channels 118.

An annular groove 130 may be formed in the body 10 at the upstream portion of the bore 21 and may have a resilient element such as an annular lock seal 132 connected thereto, the lock seal having a leg 134 extending inwardly beyond the annular groove and adapted to engage an annular groove of a mating connector. The lock seal 132 may be connected to the body 10 by any suitable means such as bonding at 136. It is noted that the upstream end of the cylindrical body is depicted as a female element in FIG. 3; however, by slight modification the cylindrical body may be made a male connector element if it be so desired.

The tubular body 100 is illustrated in FIGS. 1, 7 and 9 as a male connector element and may be comprised of an annular groove 140 in the body 100 and a depressor means which may be a ring 142 which is slidably disposed about the tubular body 100. The above structure allows our device to have the advantage of a quick connect and disconnect which is afforded by our Push-Pull Connector invention mentioned above.

The downstream portion 20 of the cylindrical body 10 may form an annular stand 150 which may be adapted to engage an annular groove of a storage rack (not shown). Also, the upstream portion 152, FIG. 1, of the stem actuated valve 14 may be designed so as to fit snugly within the inner wall 23 so that when the device is not in use a compact storage is possible.

OPERATION

Operation of our invention is extremely simple and consumes very little time. To begin, cylindrical body 10 is held upright as exemplified in FIG. 1. The body 10 is then positioned under a pellet dispenser (not shown) so that a pellet may be dropped into the bore 21 resting upon the screen 70 (or humps 71) immediately upstream of the aperture 24. The body 10 is then pushed into the male connector element (tubular body 100) at the end of the spigot 12 to connect the device to a fluid source. The fluid may then be turned on and adjusted for temperature and flow rate. This adjustment may be made because part of the fluid which enters the first bore 21 will flow through the complete bypass passageway 38 and out at the downstream end 45 and then flow through the perforated plug 98 to a drain. Some fluid will also flow through the partial bypass passageway 36 and the aperture 24 depending upon the rotational placement of the tubular valve 50.

Once the flow rate and temperature are satisfactory the tubular valve may be rotated by handle 80 for the desired strength of solution. This is accomplished by rotating the tubular valve 50 so as to align apertures 62 and 64 to any degree, respectively, with aperture 24 and passageway 36. The greater the alignment of apertures 24 and 62, the greater will be the flow of fluid around pellet 72 thereby causing it to dissolve more quickly. If more pure fluid is desired passageway 36 and aperture 64 are brought into greater alignment. A user soon determines from experience the partial alignments that he finds desirable.

If our invention is to be attached to a stem actuated valve by the conduit 56 as shown in FIG. 1, and if the task to be accomplished is the brushing of teeth, then a toothbrush insertion 154 may be made in the stem actuated valve. The insertion of the stem actuator opens the valve (as more fully explained in our above-mentioned application) within the handpiece 14 and allows fluid to flow from our device through the fluid conduit 56 to and through the toothbrush and into the user's mouth. The entire operation just described will take only a few seconds once the user become adept at using our invention. It has been found experimentally that only a few experiences are necessary before a user is able to determine the strength of mixture he desires entering his mouth, the temperature and to facilitate use of an inserted toothbrush. The pellet 72 in the case of using our invention as a dental apparatus, would be a tooth cleanser.

When the user is finished brushing, the toothbrush insert 154 may be removed and replaced with another stem actuator as described in our Hydraulic-Filament Dental Device application. When the user is completely finished with the device all he need do is turn off the fluid source, remove the stem actuator from the handpiece 14 and return the actuator to a storage rack (not shown). To disengage body 10 from body 100 all that is necessary is a downward pull on the ring 142 to disengage leg 134 of lock seal 132 and then a gentle pull downward on the body 10 to cause removal. The device may then be stored by mating its annular stand 150 with a corresponding groove within the storage rack.

Other applications may be as easily accomplished by using our invention. Depending upon the application, the size of our device and the chemical nature of the pellet 72 can be adapted as necessary, as can the stem actuator at the end of the valve 14 since any one of a great number of heads may be used to accomplish any of a great number of tasks.

We claim:

1. A mixing, dispensing and metering device comprising:
   a main body having an upstream portion and a downstream portion;
   a first bore in said body in its upstream portion and extending in a generally downstream direction through said body to a downstream base end;
   said body being adapted to receive a fluid into the first bore;
   an aperture in said body sectionally smaller than the bore and communicating with the bore at the base, said aperture extending in a downstream direction and having a downstream portion;
   means located above said aperture in the first bore for supporting a pellet and for passing a fluid along the downstream side of the pellet so as to mix, dissolve and disperse said pellet;
   said downstream portion of the aperture forming a transverse second bore; and
   a partial by-pass passageway having an upstream end opening to the first bore and having a downstream end opening to the second bore whereby the fluid can by-pass the base end of the first bore.

2. A mixing, dispensing and metering device as claimed in claim 1 including a valve means movably connected to said main body for selectively opening and closing the aperture to the passage of fluid and for selectively opening and closing the partial by-pass passageway to the passage of fluid.

3. A mixing, dispensing and metering device as claimed in claim 2 wherein said valve means comprises a movable tubular valve disposed within the second bore whereby mixing of the fluid and the pellet occurs within the tubular valve.

4. A mixing, dispensing and metering device as claimed in claim 3 including:
   a first and a second aperture in the tubular valve adapted to selectively align with the body aperture and the partial by-pass passageway respectively;
   the first valve aperture being radially offset from the second valve aperture; and
   means connected to said tubular valve for limiting the movement of said valve.

5. A mixing, dispensing and metering device as claimed in claim 1 including a complete by-pass passageway in the main body having an upstream end to the first bore and extending in a downstream direction through said body, whereby fluid can by-pass the base end of the first bore.

6. A mixing, dispensing and metering device as claimed in claim 2 including partition means located in the first bore and connected to the body for positioning and retaining a pellet.

7. A mixing, dispensing and metering device as claimed in claim 6 including:
   a tubular body having an upstream end and a downstream end adapted to be connected to a fluid source for introducing a fluid into the main body bore;

means connected to the interior of the tubular body for constricting a fluid flow through the tubular body;

a channel within the tubular body for communicating the vicinity about the constricting means with the external environment about the tubular body; and perforated means connected to the tubular body downstream of the constricting means, whereby the main body is adapted to connect to the tubular body.

8. A mixing, dispensing and metering device as claimed in claim 7 including a connector element comprising:

an annular groove in the main body disposed within the first bore;

a resilient element disposed within the annular groove and connected to said main body; and said resilient element adapted to engage an annular groove in a mating connector element.

9. A mixing, dispensing and metering device as claimed in claim 8 wherein:

the tubular body is a mating connector element and including:

an annular groove in the tubular body; and a depressor means slidable along the tubular body for disconnecting the connector elements.

10. A mixing, dispensing and metering device comprising:

a main body having an upstream portion and a downstream portion;

a first bore in said body in its upstream portion and extending in a generally downstream direction through said body to a downstream base end;

said body being adapted to receive a fluid into the first bore;

an aperture in said body sectionally smaller than the bore and communicating with the bore at the base, said aperture extending in a downstream direction and having a downstream portion;

means located above said aperture in the first bore for supporting a pellet and for passing a fluid along the downstream side of the pellet so as to mix, dissolve and disperse said pellet;

the downstream portion of the aperture forming a transverse second bore;

a partial by-pass passageway having an upstream end opening to the first bore and having a downstream end opening to the second bore whereby the fluid can by-pass the base end of the first bore;

a valve means movably connected to said main body for selectively opening and closing the aperture to the passage of fluid and for selectively opening and closing the partial by-pass passageway to the passage of fluid;

said valve means comprises a movable tubular valve disposed within the second bore;

a first and a second aperture in the tubular valve adapted to selectively align with the body aperture and the partial by-pass passageway respectively;

the first valve aperture being radially offset from the second valve aperture; and means connected to said tubular valve for limiting the movement of said valve.

References Cited

UNITED STATES PATENTS

| | | | |
|---|---|---|---|
| 2,238,969 | 4/1941 | Butterfield | 137—268 |
| 2,537,790 | 1/1951 | Sage | 239—315 XR |
| 3,070,316 | 12/1962 | Miville | 137—268 XR |
| 3,191,915 | 6/1965 | Goettl | 261—97 |
| 3,323,539 | 6/1967 | Schneider et al. | 137—268 |
| 3,386,439 | 6/1968 | Harper | 137—268 XR |

M. CARY NELSON, Primary Examiner

ROBERT J. MILLER, Assistant Examiner